United States Patent [19]

Bartl et al.

[11] Patent Number: 4,460,446
[45] Date of Patent: Jul. 17, 1984

[54] CROSSLINKING OF ETHYLENE POLYMERS

[75] Inventors: Herbert Bartl, Odenthal; Hans Rudolph, Krefeld; Joachim Thörmer, Leverkusen, all of Fed. Rep. of Germany

[73] Assignee: Bayer Aktiengesellschaft, Leverkusen, Fed. Rep. of Germany

[21] Appl. No.: 477,953

[22] Filed: Mar. 23, 1983

[30] Foreign Application Priority Data

Apr. 3, 1982 [DE] Fed. Rep. of Germany ....... 3212538

[51] Int. Cl.³ .................. C08F 255/00; C08F 255/04; C08J 3/24; C08J 3/28
[52] U.S. Cl. ......................... 204/159.17; 204/159.2; 525/303; 525/304
[58] Field of Search ................. 525/304, 303; 204/159.17, 159.2

[56] References Cited

U.S. PATENT DOCUMENTS 3,806,555  4/1974  Wagaoka et al. ................... 525/289
4,104,329  8/1978  Abou-Sabet et al. ............... 525/304
4,116,784  9/1978  Hosoi et al. .................... 204/159.17

FOREIGN PATENT DOCUMENTS 55-6955  2/1980  Japan ................................. 525/304

*Primary Examiner*—Allan Lieberman
*Attorney, Agent, or Firm*—Connolly and Hutz

[57] ABSTRACT

A process for crosslinking with peroxides using triallyl citrates as activators and co-agents.

4 Claims, No Drawings in the same way as described in Example 1. The measured values obtained are set out in Table 1.

EXAMPLE 4

The procedure is as described in Example 3, except that 2 parts of triallyl citrate are additionally incorporated in the rubber mixture. The measured values are set out in Table 1. It was found that, in this case, too, the addition of triallyl citrate reduced the Mooney viscosity and considerably improves the mechanical properties so that a high degree of crosslinking is obtained (for vulcanisation, see Example 1). Compression set is improved by 15 to 20%.

EXAMPLE 5 (Comparison Example)

Using laboratory mixing rolls, a rubber mixture is prepared from 100 parts of EPM[1], 1 part of stearic acid, 1 part of styrenised diphenyl amine[2], 60 parts of FEF carbon black and 4 parts of aralkyl peroxide[4]. Further processing is carried out in the same way as described in Example 1. The measured values are shown in Table 1.

EXAMPLE 6

A rubber mixture was prepared on laboratory mixing rolls in the same way as described in Example 5 with 3 parts of triallyl citrate being additionally incorporated in the mixture. The triallyl citrate again reduces the Mooney viscosity of the mixture whilst the mechanical values after press vulcanisation at 170° C. are indicative of a high degree of vulcanisation. Compression set is improved by almost 50% compared with Example 5. The measured values are shown in Table 1.

EXAMPLE 7 (Comparison Example)

A rubber mixture is prepared on laboratory mixing rolls from 100 parts of chlorinated polyethylene[5] (CPE), 0.75 part of styrenised diphenyl amine[2], 10 parts of magnesium oxide, 25 parts of dioctyl phthalate, 70 parts of SRF-LM carbon black and 5 parts of an aralkyl peroxide[4]. Vulcanisation is carried out in the same way as described in Example 1. The measured values obtained are set out in Table 2.
[5]Bayer CM 3630, a product of Bayer AG.

EXAMPLE 8

The procedure is as described in Example 7. 4.5 parts of triallyl citrate are additionally incorporated in the mixture. Crosslinking is carried out in the same way as described in Example 1. The measured values are shown in Table 2.

EXAMPLE 9 (Comparison Example)

A fire-retarding mixture is prepared in the same way as described in Example 1 using the same polymer (100 parts). 120 parts of an aluminium oxyhydrate are used as filler. 1.5 parts of vinyl silane, 1 part of stearic acid, 1 part of styrenised diphenyl amine and 5 parts of an aralkyl peroxide are additionally incorporated. The mixture was vulcanised in the same way as described in Example 1. The measured values are set out in Table 2.

EXAMPLE 10

The procedure is as described in Example 9, except that 4 parts of triallyl citrate are additionally incorporated. The properties of the mixture and the vulcanisate values are shown in Table 2.

EXAMPLE 11 (Comparison Example)

100 parts of a terpolymer (produced in accordance with DE-OS No. 28 43 041), 1 part of stearic acid, 1 part of PE-wax, 3 parts of polycarbodiimide, 1 part of a styrenised diphenyl amine[2], 25 parts of FEF carbon black, 45 parts of HAF carbon black and 4.5 parts of an aralkyl peroxide[4] are thoroughly mixed on laboratory mixing rolls and the resulting mixture is vulcanised in the same way as described in Example 1. The Mooney viscosity and mechanical values are shown in Table 3.

EXAMPLE 12

The procedure is as described in Example 11, except that 3.5 parts of triallyl citrate are added to the mixture. The mixture obtained shows a lower Mooney viscosity and considerably improved mechanical values after vulcanisation (cf. Example 1) compared with the test without triallyl citrate.

EXAMPLE 13 (Comparison Example)

Using laboratory mixing rolls, a mixture is prepared from 100 parts of a hydrogenated nitrile rubber as described in DE-OS No. 25 39 132. The additional constituents of the mixture are 1 part of stearic acid, 10 parts of magnesium oxide, 1.5 parts of a styrenised diphenyl amine[2] 1.5 parts of the zinc salt of 2-mercaptobenzimidazole[6], 25 parts of FEF carbon black, 50 parts of MT carbon black and 4.5 parts of an aralkyl peroxide[4]. Vulcanisation was carried out in accordance with Example 1. The measured values of the mixture and of the vulcanisate are shown in Table 3.
[6]Vulkanox ZMB-2 ®, a product of Bayer AG.

EXAMPLE 14

The procedure is as described in Example 13, except that the mixture additionally contains 3.5 parts of triallyl citrate. A more favourable mixture viscosity and a considerably better degree of crosslinking than without triallyl citrate are obtained after vulcanisation as described in Example 1. The data are set out in Table 3.

EXAMPLE 15

The procedure was as described in Example 2, except that 3 parts of acetyl triallyl citrate were used instead of the 3 parts of triallyl citrate. The results of the vulcanisate tests are set out in Table 4.

EXAMPLE 16

The procedure was as described in Example 6, except that 3 parts of acetyl triallyl citrate were used instead of the 3 parts of triallyl citrate. The results of the vulcanisate tests are set out in Table 4.

EXAMPLE 17 (Comparison Example)

100 parts of polyethylene (BAYLON 19 N 430 ® a product of Bayer AG) were mixed with 1 part of stearic acid, 0.5 part of Vulkanox DDA (Trade Mark) and 4.5 parts of peroxide (Perkadox 14/40 ®, a product of AKZO) on laboratory mixing rolls heated to 110° C.

4-mm-flaps were vulcanised for 22 minutes at 170° C. and DIN-ring powders stamped out therefrom. Swelling at 50° C. in toluene was measured on the inner rings, the results being shown in Table 4.

EXAMPLE 18

The procedure was as described in Example 17, except that 3 parts of triallyl citrate were additionally

CROSSLINKING OF ETHYLENE POLYMERS

This invention relates to crosslinking of ethylene polymers.

It is known that the degree of crosslinking of ethylene polymers can be increased by using triallyl cyanurate as well as a relatively large number of other polyunsaturated compounds although, for various reasons, they have not proved to be as effective as triallyl cyanurate. However, triallyl cyanurate contains nitrogen so that, in the event of smouldering fires, for example, oxides of nitrogen are in danger of being formed. Because of this, it is desirable to take precautions so that, for example in the class of highly weather-resistant and heat-resistant elastomers of the type used as cable sheating, no oxides of nitrogen should be formed in the event of fire. Polymers which have proved to be suitable for this purpose are ethylene/vinyl acetate copolymers particularly those which, by nature, have elastomeric properties, i.e. a vinyl acetate content of from 35 to 50%.

It has now been found that triallyl citrates are effective as co-agents and activators for crosslinking with peroxides. These compounds do not contain any nitrogen and, thus, the replacement of triallyl cyanurate by triallyl citrates represents an advance.

In addition, it has been found, for example, that, through the addition of triallyl citrates, the viscosity of the mixtures is very distinctly reduced, an advantage in regard to better processibility despite high filling levels.

According to this invention, it is possible to use triallyl citrates corresponding to the following formula (I):

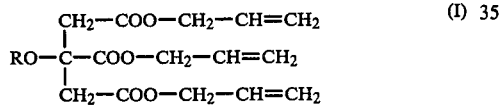

in which R represents hydrogen, a saturated or unsaturated aliphatic radical, an optionally substituted aromatic radical, an optionally substituted aromatic-aliphatic radical or an acyl radical corresponding to the following formula (Ia):

in which $R^1$ respresents a saturated or unsaturated aliphatic radical or an aromatic radical.

It has been found that, by using the triallyl citrates, it is possible to improve not only the crosslinking of ethylene/vinyl acetate copolymers, but also the crosslinking of other ethylene polymers, such as polyethylene, ethylenepropylene copolymers, chlorinated polyethylene and other ethylene polymers and copolymers.

It is preferred to use triallyl citrates of formula (I) in which R represents hydrogen, a saturated or unsaturated $C_1-C_{18}$-aliphatic radical, an aromatic $C_6-C_{10}$ radical optionally substituted by halogen or $C_1-C_4$ alkyl groups, an optionally substituted aliphatic $C_7-C_{11}$ radical or an acyl radical of formula (Ia) in which $R^1$ represents a saturated or unsaturated aliphatic $C_1-C_{18}$ radical or an aromatic $C_6-C_{10}$ radical.

It is particularly preferred to use triallyl citrates corresponding to formula (I) in which: R represents hydrogen, a saturated or unsaturated aliphatic $C_1-C_4$ radical, a phenyl radical or a benzyl radical optionally substituted by chlorine, bromine and methyl groups or an acyl radical of formula (Ia) in which $R^1$ represents a saturated or unsaturated aliphatic $C_1-C_4$ radical or a phenyl radical.

It is especially preferred to use triallyl acetyl citrate and triallyl citrate.

Since the triallyl citrates are based on citric acid, they are particularly suitable for use in the production of elastomeric articles for the food or medical field.

The citric acid triallyl esters may be obtained by known methods. For vulcanisation, they are added to the elastomers preferably in a quantity of from 0.1 to 8 parts by weight, more preferably in a quantity of from 0.5 to 5 parts by weight and, most preferably, in a quantity of from 1 to 4 parts by weight based on elastomer, together with radical-forming agents of the type normally used for crosslinking saturated polymers.

Examples of suitable radical-forming agents are persulfates, perborates, peroxides, such as benzoyl peroxide, perpivalate, tert.-butyl hydroperoxide, peroxy dicarbonates, such as dicyclohexyl peroxy dicarbonate, di-tert.-butyl peroxide, cyclohexane peroxide, dicumyl peroxide, and also high-energy radiation, such as highly accelerated electron beams.

The polymers to be vulcanised may be filled, for example, with the usual reinforcing and non-reinforcing fillers and may have antiagers and light stabilisers, for example, added to them.

EXAMPLE 1 (Comparison Example)

100 parts of an ethylene/vinyl acetate copolymer[1] (EVAC) containing 45% of vinyl acetate are thoroughly mixed on laboratory mixing rolls or in a laboratory kneader with 45 parts of FEF carbon black, 1 part of stearic acid, 1 part of styrenised p-phenylene diamine[2], 3 parts of a polycarbodiimide[3] and 4.5 parts of an aralkyl peroxide[4]. The rubber mixture obtained is crosslinked in a press at 170° C. The 4 mm rings obtained have the mechanical properties set out in Table 1 under Example 1. The corresponding tests were carried out in accordance with DIN 53 504. The compression set value was determined in accordance with DIN 53 517, specimen mould B.

[1]Levapren 450 ®, a product of Bayer AG.
[2]Vulklnox DDA ®, a product of Bayer AG.
[3]Stabaxol P, a product of Bayer AG.
[4]Perkadox 14/40 ®, a product of AKZO.

EXAMPLE 2

The same mixture as described in Example 1 is prepared except that 3 parts of triallyl citrate are additionally worked into the mixture. Measurement of the Mooney viscosity produces a lower value, the vulcanisate values as measured on 4 mm rings (cf. Example 1) being considerably better and indicating a high degree of crosslinking. The compression set value is also improved by almost 50% by the addition of triallyl citrate. The values are shown in Table 1.

EXAMPLE 3 (Comparison Example)

A rubber mixture is prepared in the same way as described in Example 1, except that 100 parts of the elastomer EPDM[1] are used. 1 part of stearic acid, 1 part of styrenised diphenyl amine[2], 60 parts of FEF carbon black and 4 parts of aralkyl peroxide[4] are used as additional ingredients. Vulcanisation was carried out incorporated in the mixture. The results of the vulcanisate swelling test are shown in Table 4.

TABLE 1

| Example No. | 1 | 2 | 3 | 4 | 5 | 6 |
|---|---|---|---|---|---|---|
| Mooney viscosity ML 4/100° C. | 36 | 31 | 110 | 98 | 80 | 71 |
| Tensile strength (mP.a) | 10.6 | 12.9 | 17.1 | 16.9 | 11 | 14 |
| Breaking elongation (%) | 435 | 250 | 300 | 240 | 510 | 345 |
| M 100% (mP.a) | 3.3 | 4.6 | 4.1 | 5 | 1.6 | 2.5 |
| M 200% (mP.a) | 6.9 | 11.7 | 11.2 | 15.2 | 3.5 | 7.7 |
| Shore A hardness (at 23° C.) | 67 | 70 | 73 | 74 | 59 | 64 |
| Resilience (%) | 35 | 34 | 47 | 51 | 47 | 49 |
| Compression set according to DIN 53 517 specimen mould B, 70 h/125° C. (%) | 27 | 14 | 16 | 13 | 35 | 20 |

Comments on Table 1:
In addition to reducing the Mooney viscosity value, it is shown that the use of triallyl citrate as co-agent for crosslinking considerably improves the vulcanisate value (modulus values, compression set).

TABLE 2

| Example No. | 7 | 8 | 9 | 10 |
|---|---|---|---|---|
| Mooney viscosity ML 4/100° C. | 75 | 70 | 32 | 27 |
| Tensile strength (MPa) | 13.5 | 14.8 | 9.7 | 11.5 |
| Breaking elongation (%) | 680 | 405 | 200 | 140 |
| M 100% (MPa) | 2.6 | 3.7 | 6.2 | 9.1 |
| M 200% (MPa) | 6.4 | 9.1 | — | — |
| Shore A hardness (at 23° C.) | 68 | 71 | 73 | 77 |
| Resilience (%) | 22 | 25 | 32 | 34 |
| Compression set according to DIN 53 517 specimen mould B 70 h/120° C. (%) | 40.0 | 32.7 | not measured | not measured |

Comments on Table 2:
The Mooney viscosity of each mixture is produced by the addition of triallyl citrate and the degree of crosslinking is considerably increased. Higher modulus values, high hardness values and a considerably improved compression set value are obtained. In Example 10, tensile strength is improved by almost 20%.

TABLE 3

| Example No. | 11 | 12 | 13 | 14 |
|---|---|---|---|---|
| Mooney viscosity ML 4/100° C. | 51 | 45 | 130 | 117 |
| Tensile strength (MPa) | 8.5 | 10.5 | 15.7 | 16.5 |
| Breaking elongation (%) | 340 | 280 | 440 | 350 |
| M 100% (MPa) | 2.2 | 3.0 | 4.2 | 5.1 |
| M 200% (MPa) | 5.4 | 8.4 | 10.6 | 12.2 |
| Shore A hardness (at 23° C.) | 59 | 64 | 73 | 76 |
| Resilience (%) | 6 | 7 | 41 | 41 |
| Compression set according to DIN 53 517 specimen mould B 70 h/150° C. (%) | 50.0 | 42.2 | 51.8 | 44.2 |

Comments on Table 3:
The Mooney viscosity of each mixture is reduced by the addition of triallyl citrate and the degree of crosslinking is considerably increased. Higher modulus values, higher hardness values and an improved compression set value are obtained. In Example 12, tensile strength is improved by almost 30%.

TABLE 4

| Example No. | 15 | 16 | 17 | 18 |
|---|---|---|---|---|
| Mooney viscosity ML 4/100° C. | 28 | 66 | — | — |
| Tensile strength (MPa) | 13.6 | 12.6 | — | — |
| Breaking elongation (%) | 320 | 370 | — | — |
| M 100% (MPa) | 3.7 | 2.0 | — | — |
| M 200% (MPa) | 9.7 | 5.7 | — | — |
| Shore A hardness (at 23° C.) | 65 | 60 | 41 | 42 |
| Resilience (%) | 36 | 52 | — | — |
| Compression set according to DIN 53 517 specimen mould B 70 h/125° C. (%) | 17 | 24 | — | — |
| Increase in weight in toluene at 50° C. | — | — | 36.4 | 50.1 |

Comments on Table 4
Compared with the "O" mixtures 1 and 5, the mixtures and vulcanisates containing acetyl triallyl citrate show lower mixture viscosities and high degrees of crosslinking (modulus values and compression set value). The PE-vulcanisate shows improved swelling values.

We claim:

1. In the process for crosslinking ethylene polymers and copolymers with radical forming agents in the presence of a co-agent/activator, the improvement which comprises said co-agent/activator comprising from 0.1 to 8 parts by weight of triallyl citrates corresponding to the formula $$\begin{array}{c} CH_2-COOCH_2-CH=CH_2 \\ | \\ RO-C-COOCH_2-CH=CH \\ | \\ CH_2-COOCH_2-CH=CH_2 \end{array}$$

in which R represents hydrogen, a saturated or unsaturated aliphatic radical, an optionally substituted aromatic radical, an optionally substituted aromatic-aliphatic radical or an acyl radical corresponding to the following formula $$\begin{array}{c} R^1-C- \\ \| \\ O \end{array}$$

in which $R^1$ represents a saturated or unsaturated aliphatic radical or an aromatic radical.

2. The process according to claim 1 wherein the coagent/activator comprises 0.5 to 5 parts by weight of the triallyl citrates.

3. The process according to claim 1 wherein the ethylene polymers and copolymers comprise polyethylene, ethylene/vinyl acetate copolymers, ethylene-propylene copolymers or chlorinated polyethylene.

4. The process according to claim 1 wherein the radical forming agents comprise persulfates, perborates, peroxides or high energy radiation.

* * * * *